UNITED STATES PATENT OFFICE.

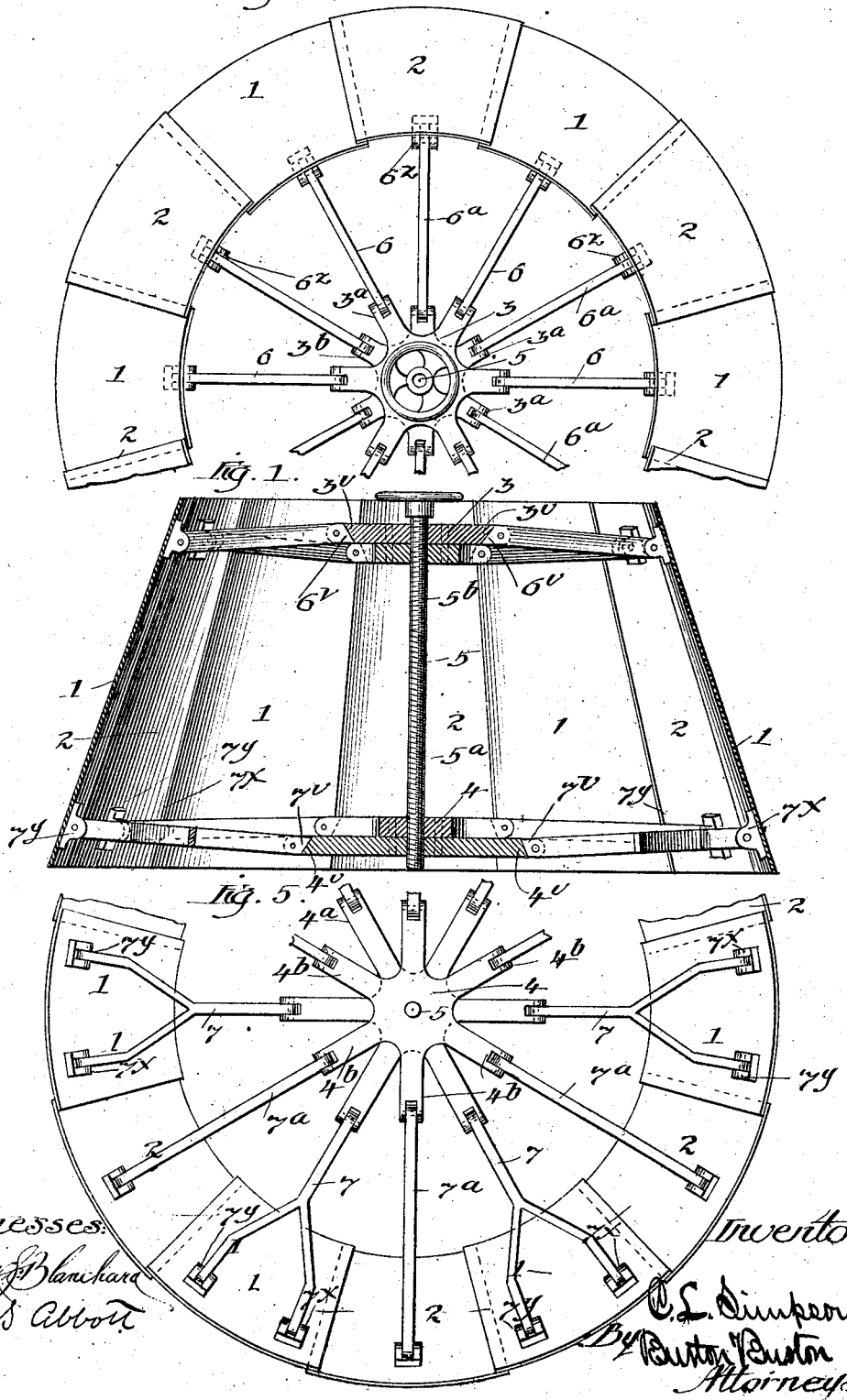

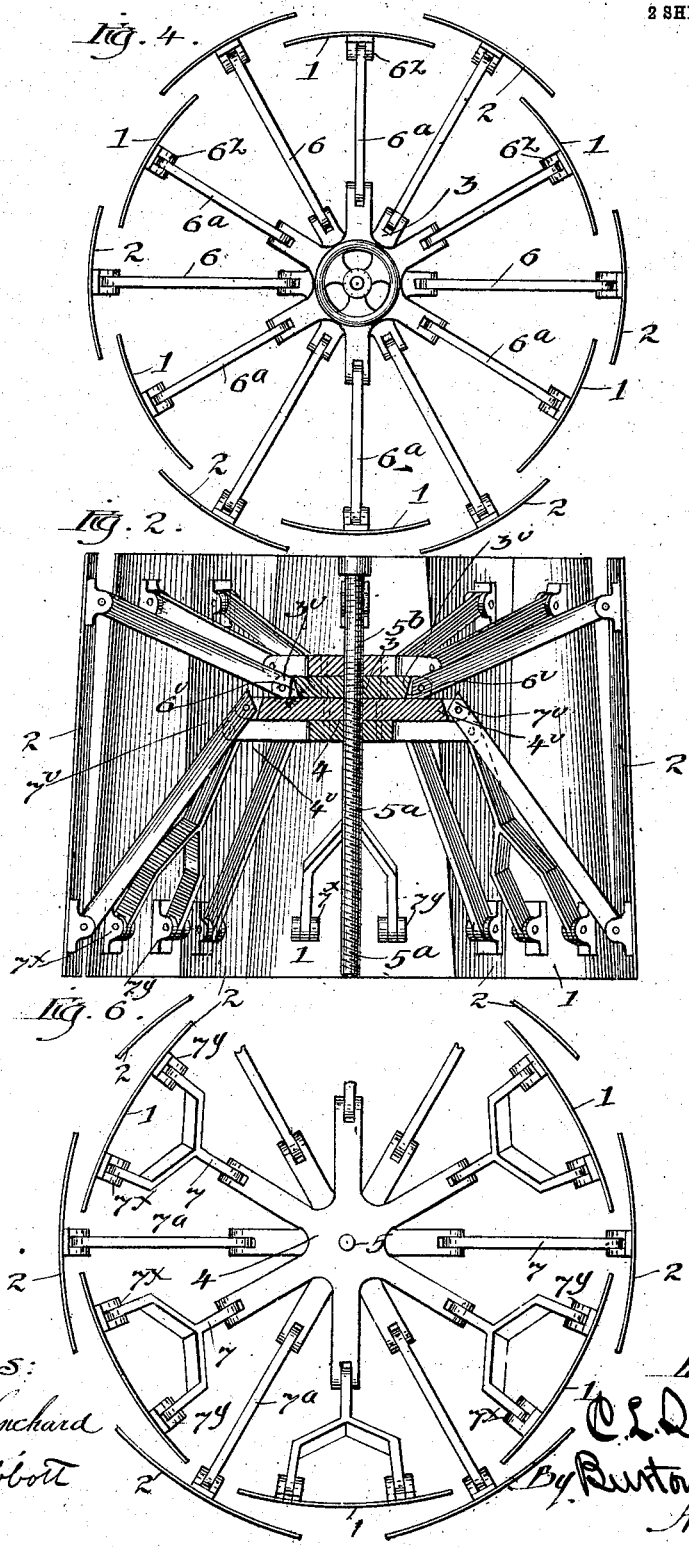

CHARLES L. SIMPSON, OF MINNEAPOLIS, MINNESOTA, ASSIGNOR TO MIRACLE PRESSED STONE COMPANY, OF MINNEAPOLIS, MINNESOTA, A CORPORATION OF SOUTH DAKOTA.

COLLAPSIBLE INNER SHELL FOR MOLDING TAPERING PIPE.

No. 867,431.  Specification of Letters Patent.  Patented Oct. 1, 1907.

Application filed June 29, 1907. Serial No. 381,414.

*To all whom it may concern:*

Be it known that I, CHARLES L. SIMPSON, a citizen of the United States, residing at Minneapolis, in the county of Hennepin and State of Minnesota, have invented new and useful Improvements in Collapsible Inner Shells for Molding Tapering Pipe, of which the following is a specification, reference being had to the accompanying drawings, forming a part thereof.

The purpose of this invention is to provide an improved construction of collapsible core or inner member or shell of a mold for molding of plastic material, such as cement concrete or clay, tapering pipe sections such as are required for connecting different sizes of sewer pipe or drain tile or for forming the top or mouth-piece of a sewer catch-basin or manhole.

It consists of the features of construction shown and described as indicated in the claims.

In the drawings:—Figure 1 is an axial section of the inner member of a mold embodying this invention, the same being shown at fully expanded position. Fig. 2 is a similar view showing the shell collapsed to its minimum dimensions. Fig. 3 is an end view of the expanded shell showing it in fully expanded position corresponding to Fig. 1. Fig. 4 is a similar view of the same end, showing it at collapsed or contracted position corresponding to Fig. 2. Fig. 5 is a view similar to Fig. 2 of the opposite end of the shell. Fig. 6 is a view similar to Fig. 4 of said opposite end.

The shell comprises two series of tapering segmental plates, 1 and 2, the plates, 2, being of the same form as the plates, 1, but alternating with the latter lapping outside thereof, so that when the shell is expanded to cause the lapping plates to come into contact at their lapped edges, outward pressure upon all the sections opposed to the exterior resistance of the molded material tends to keep the lapped joints closed so as to make a complete inner wall of the mold. The segments are designed to be so thin that the slight longitudinal shoulders formed on the inner wall of the molded body by the edges of the outer lapped segments corresponding to the thickness constitute negligible features so far as the utility of the molded pipe is concerned. For collapsing and expanding the mold formed of these segmental plates, there are provided two travelers, 3 and 4, running upon a right-and-left threaded shaft, 5, the travelers being correspondingly apertured and threaded for penetration at the center by the shaft, so that being thereon, the rotation of the shaft causes the travelers restrained from rotating to travel in opposite directions along the shaft.

Each traveler comprises two series of radial lugs or fingers, $3^a$, $3^b$ and $4^a$, $4^b$, the fingers, $3^a$ and $4^a$, being longer than the fingers, $3^b$ and $4^b$, respectively. The series of longer fingers, $3^a$ and $4^a$, are connected by links, 6 and 7, with the inner segments, 1, of the shell, the links, 6, from the traveler, 3, extending to the upper or narrower end, and the links, 7, from the traveler, 4, extending to the lower or wider end of the respective segments. The links, $6^a$ and $7^a$, from the shorter lugs $3^b$ and $4^b$ of the travelers, 3 and 4, respectively, extend respectively to the upper and lower ends of the outer segment plates, 2. A specific purpose of the construction shown is to cause the shell in collapsing to reduce its wider end to such dimensions as to permit it to be withdrawn from the smaller end of the molded body or tapering pipe, and this purpose requires means for collapsing the shell at the wider end more rapidly than at the narrower end by the rotation of the screw shaft. This is accomplished by making the pitch of the left-hand screw thread, $5^a$, which engages the traveler, 4, greater than that of the screw threads, $5^b$, which engage the traveler, 3. It is preferable, also, in making the left-hand screw of greater pitch, to make it with a double thread, the right-hand screw at the upper end of the shaft being single thread. The lugs of the traveler which are connected with the outer set of segments, 2, which are shorter than those which connect with the inner set, are also offset inwardly along the axis of the shell from said longer lugs. This causes a distinct difference in the ratio of the length of the lug,— that is, the distance of the link pivot thereon from the axis of the shaft,—to the length of the link connected with it, the purpose and effect of which is, as will be understood by comparison of the expanded and collapsed views, to cause the inner series of segment plates to withdraw inward from the outer in the collapsing action. This is desirable for the purpose of easing the collapsing and expanding action, because it prevents the plates from holding each other frictionally by their contact in the expanding and collapsing movement. In order to cause the links, 7 and $7^a$, which brace the wider ends of the segment plates to perform that function most effectively and in such manner as to most perfectly prevent the collapse or flattening of the plates in the pressure of the molded material as it is tamped into the mold, I prefer to fork the ends of the links, $7^a$, which connect the inner series of segment plates, 1, giving said links two pivotal connections, $7^x$ and $7^y$, with their respective plates. The links, 7, which connect with the outer series of plates, 2, are not thus forked but are connected with their respective plates by a single pivot, $7^z$, at the middle of the width of the plate. By properly spreading the fork arms of the forked links, this arrangement gives three equally spaced bearings or bracing points for each two consecutive links, thus distributing the bracing uniformly throughout the circumference; and the inner plates having the double bracing by their edges lapped inside the outer plates transmit the resistance of the braces to said outer plates at the edges supplementing the bracing which they receive at the middle from their own links. In order to prevent the links from being folded back past the point of greatest extension after the movement of the travelers has caused them to be thus extended, the travelers are provided with shoulders, $6^v$, which stop the ends of the links substantially at the point of greatest extension, said shoulders and the coöperating ends of the links being shaped so as not to interfere with the folding of the links in direction for the collapse of the shell,—that is, for the movement of the travelers inward from the ends of the screw shaft, 5.

I claim:—

1. An inner member of a pipe mold consisting of an expansible and collapsible shell comprising two sets of segmental plates, the plates of one set being lapped outside those of the other set; an axial shaft and two travelers mounted for movement there-along; links from each traveler to the plates of the two sets, the links for the outer-lapped set being pivoted to the travelers nearer the axis of the shell than those for the inner-lapped set.

2. The inner member of a pipe mold consisting of an expansible and collapsible shell comprising two sets of segmental plates, the plates of one set being lapped outside those of the other set; an axial screw shaft oppositely threaded at its opposite end portions; two travelers mounted for non-rotative travel on the shaft by rotation of the latter; links from each traveler to the plates of the two sets, the length of the links for the outer-lapped set being greater in proportion to the distance from the axis of their pivotal connection to the traveler than the links for the other set.

3. An inner member of a pipe mold consisting of an expansible and collapsible shell comprising two sets of segmental plates, the plates of one set being lapped outside those of the other set; an axial screw shaft oppositely threaded at its opposite end portions; two travelers engaged with said oppositely threaded portions respectively; links which connect the travelers respectively to the opposite ends of the segment plates, the links for the outer-lapped plates being pivoted to the travelers at transverse planes inward from the planes at which the links for the other set are pivoted, all the links from each spider being pivoted to the segments at substantially the same transverse plane.

4. The inner member of a pipe mold consisting of an expansible and collapsible shell comprising segmental plates; an axial screw shaft having its opposite end portions oppositely threaded; two travelers engaged with said oppositely threaded portions respectively for non-rotative travel along the shaft by the rotation thereof; links connecting the travelers respectively with opposite ends of the plates, the shaft having its thread for engagement with one of the travelers of greater pitch than that for engagement with the other.

5. In an inner member of a pipe mold consisting of an expansible and collapsible shell comprising two sets of segmental plates, the plates of one set being lapped outside those of the other set; an axial screw shaft oppositely threaded at its opposite end portions and travelers mounted respectively on said oppositely threaded portion for non-rotative travel there-along by the rotation of the shaft; links from the respective travelers to opposite ends of the plates, the shaft having its thread for engagement with one of the travelers of greater pitch than the other, and means for rotating the shaft in the travelers.

6. An inner member of a pipe mold consisting of an expansible and collapsible shell comprising two sets of tapered segmental plates, the plates of one set being lapped outside those of the other set; an axial screw shaft having its opposite end portions oppositely threaded; two travelers mounted on said shaft for the non-rotative movement there-along by the rotation of the shaft; links connecting the travelers respectively with opposite ends of the plates, the links for the outer-lapped set being longer relatively to the distance from the axis of their pivotal connection with the travelers than the links of the other set, the shaft having its thread for engagement with one of the travelers of greater pitch than that for engagement of the other traveler, and means for rotating the shaft.

In testimony whereof, I have hereunto set my hand, in the presence of two witnesses, at Minneapolis, Minn., this 24 day of June, 1907.

CHARLES L. SIMPSON.

In the presence of—
A. M. MORSHARE,
W. I. JENKINS.